July 17, 1934.  G. N. WILLIAMS  1,966,532
NONROTATIVE REEL
Filed March 11, 1933    5 Sheets-Sheet 1
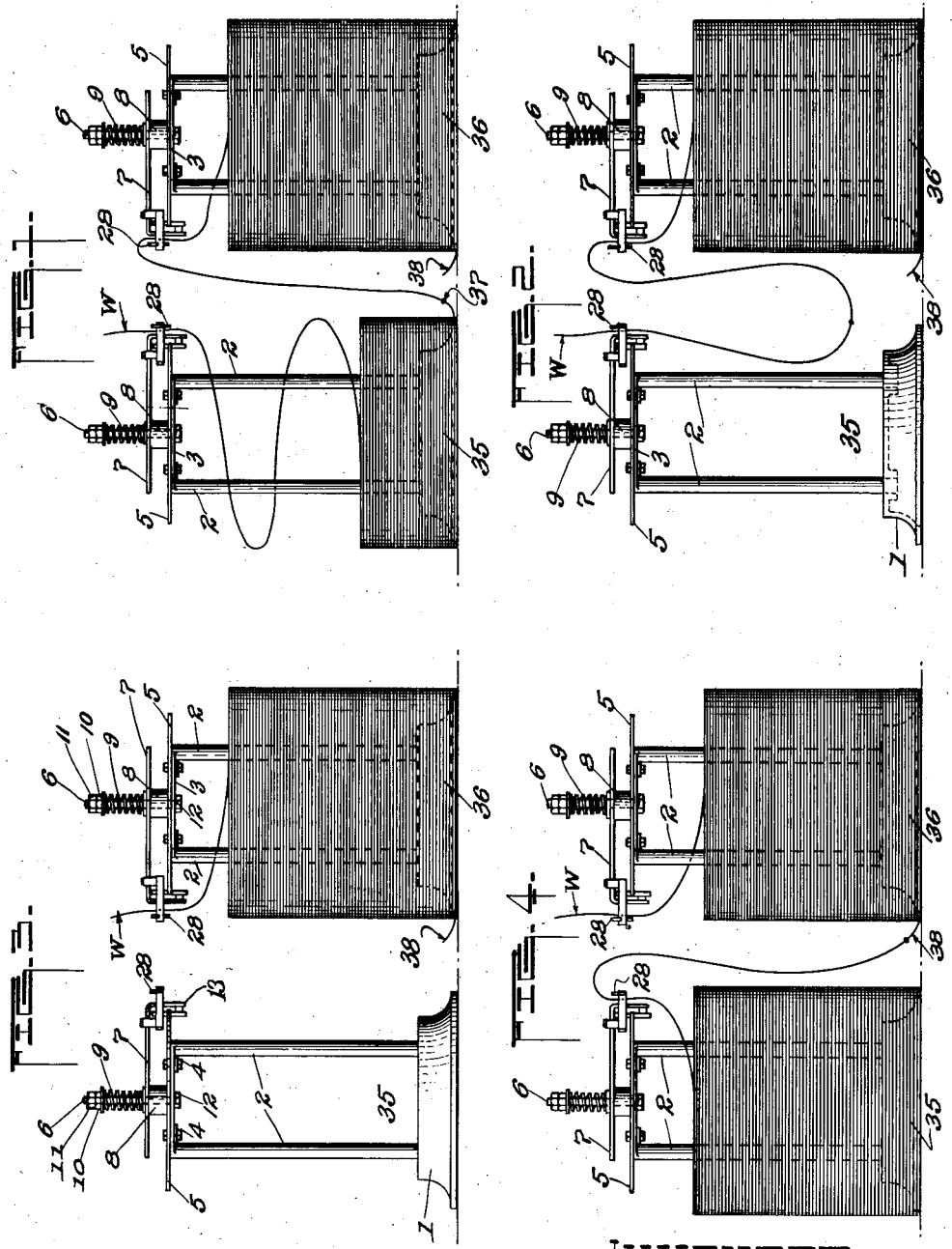
INVENTOR.
George N. Williams.

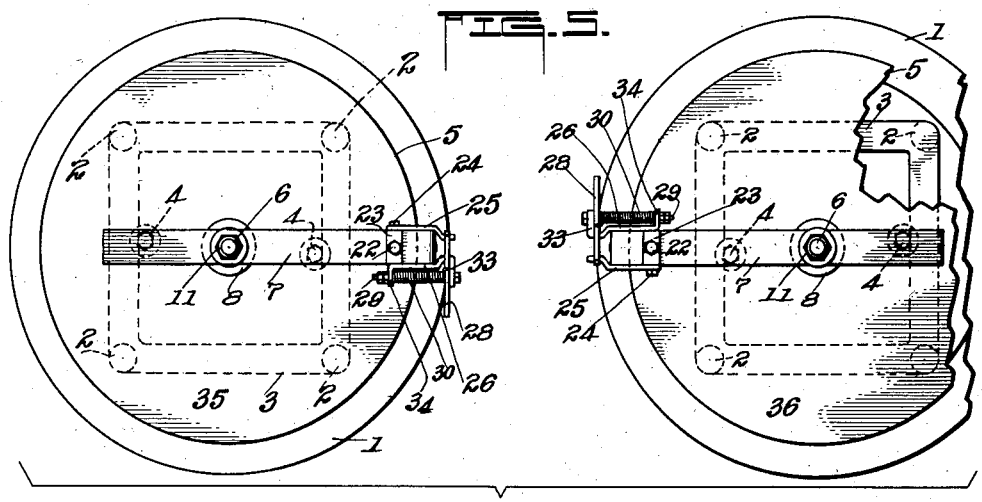
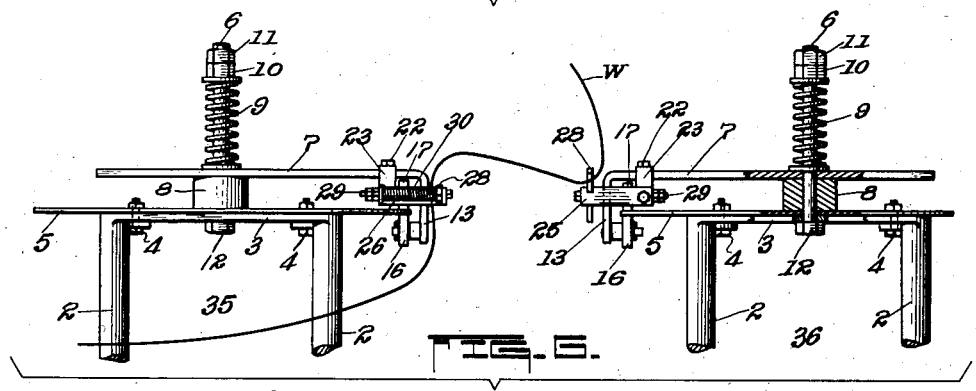
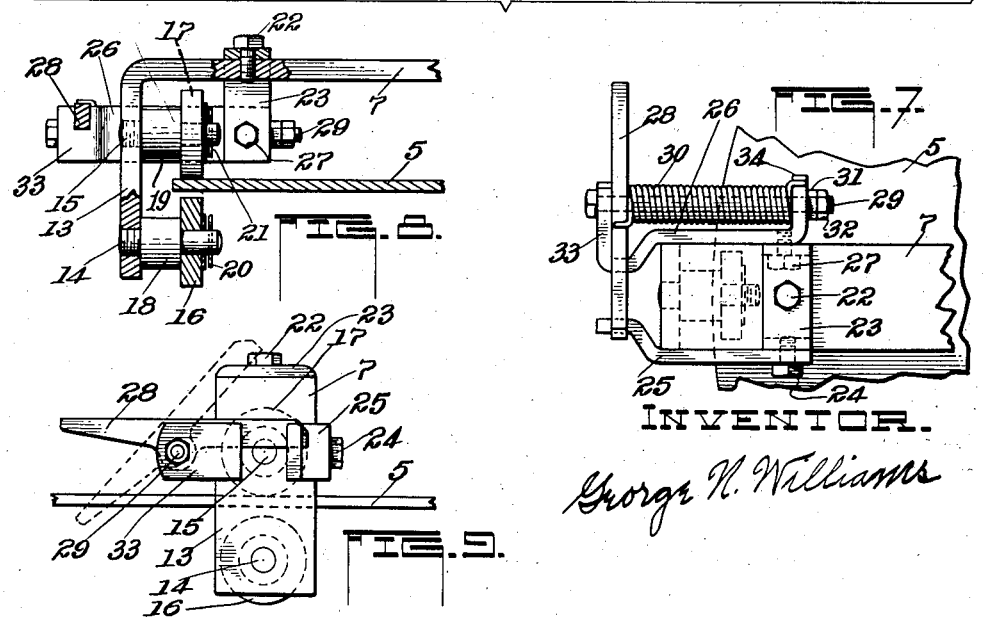

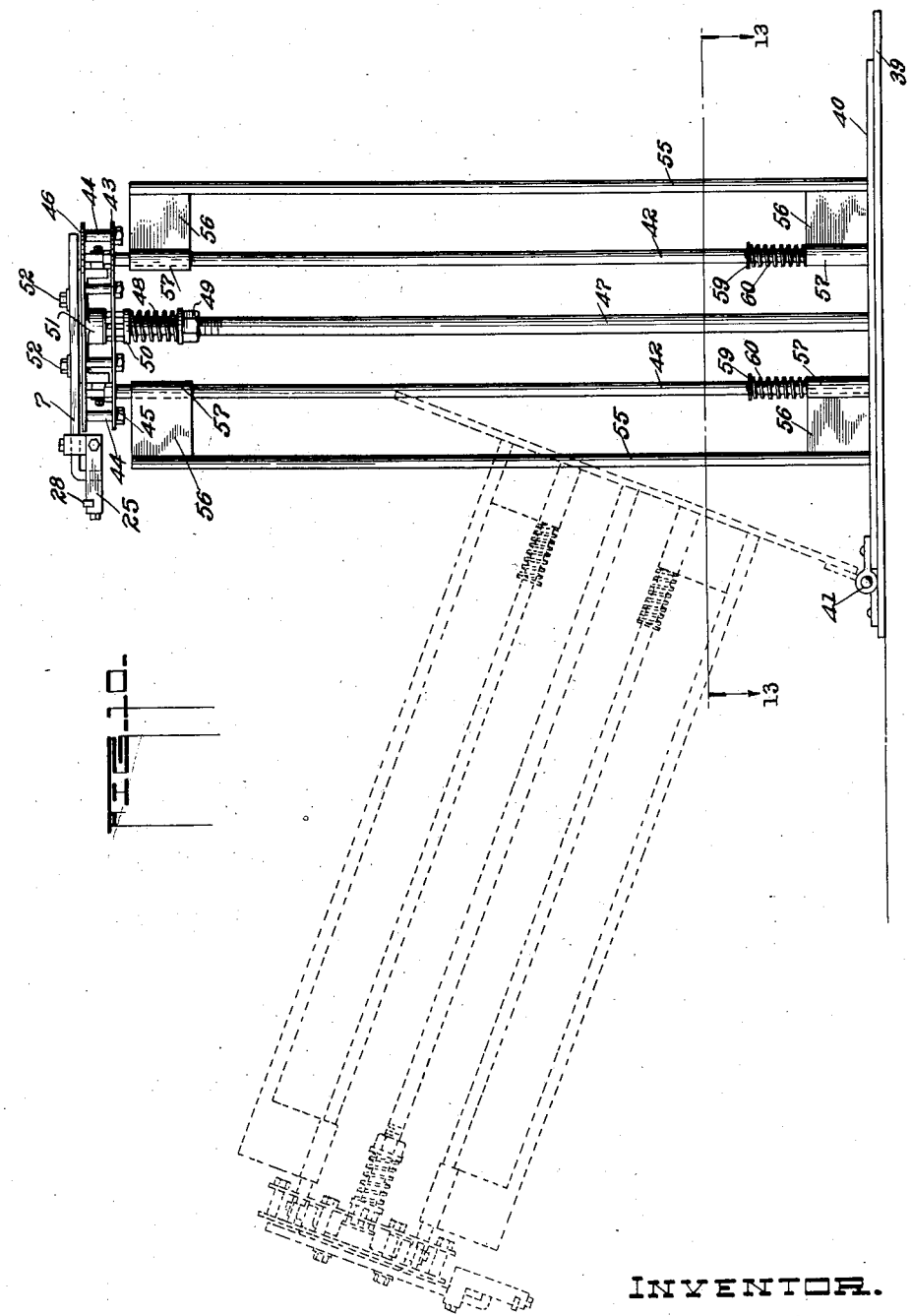

July 17, 1934.                G. N. WILLIAMS                1,966,532
NONROTATIVE REEL
Filed March 11, 1933        5 Sheets-Sheet 4

INVENTOR.
George N. Williams

July 17, 1934.  G. N. WILLIAMS  1,966,532
NONROTATIVE REEL
Filed March 11, 1933  5 Sheets-Sheet 5

INVENTOR.
George N. Williams

Patented July 17, 1934

1,966,532

UNITED STATES PATENT OFFICE 1,966,532

NONROTATIVE REEL

George N. Williams, Kokomo, Ind., assignor to Continental Steel Corporation, Kokomo, Ind., a corporation of Indiana Application March 11, 1933, Serial No. 660,435

4 Claims. (Cl. 242—128)

This invention relates to new and useful improvements in non-rotative reels particularly adapted for holding coils of wire relative to said coils being unwound therefrom.

The particular object of this invention is to provide a reel means adapted for automatic transfer of the wire supply from one reel, immediately as the last of the wire is removed therefrom, to a companion reel having a supply of wire thereon.

Another object of this invention is to provide a reel adapted for quick, easy and simple adjustment with respect to the inside diameters of bundles of wire to be placed thereon.

Still another object of the invention is to provide a reel means having wire uncoiling means but where said reel means, per se, does not rotate.

A further object of this invention is to provide reel means adapted to furnish a continuous supply of wire therefrom.

A still further object of this invention is to provide a reel adapted to be tilted for loading or unloading.

Other objects of this invention will appear as the description proceeds.

Referring now to the accompanying drawings, forming a part of this specification, illustrating preferred embodiments of this invention:

Figure 1 is a side elevational view of a pair of my automatic transfer reels showing a first step in the transfer operation;

Figure 2 is a side elevational view, similar to Figure 1, showing a second step in the transfer operation;

Figure 3 is a side elevational view, similar to Figure 2, showing a third step in the transfer operation;

Figure 4 is a side elevational view, similar to Figure 1, showing a fourth step in the transfer operation, in which the wire has been completely transferred to another reel;

Figure 5 is a top plan view, similar to that shown in Figures 1, 2, 3, and 4 certain parts being broken away;

Figure 6 is a partial side elevational view of parts shown in Figure 5;

Figure 7 is an enlarged top plan view of parts appearing in Figure 5;

Figure 8 is a sectional elevational view of parts shown in Figure 7;

Figure 9 is an end elevational view of parts shown in Figure 7, the dotted lines indicating the released position of the latch member;

Figure 10 is a side elevational view showing a modification of my invention, certain positions being shown in dotted lines;

Like characters of reference denote like parts through the figures.

Figure 11:
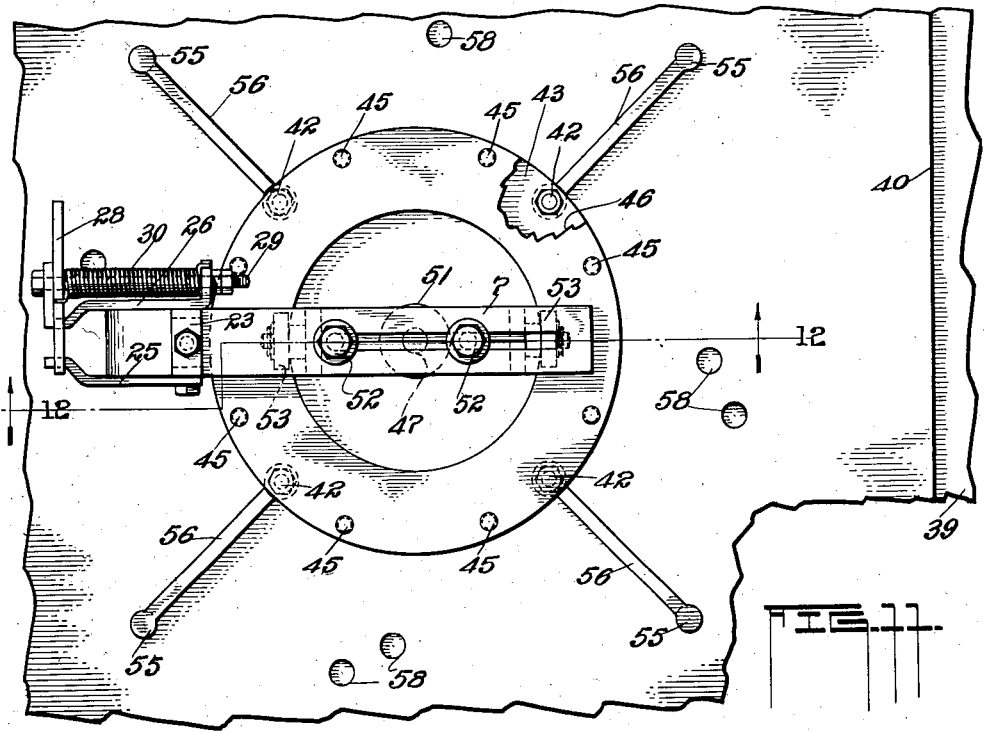
Figure 11 is an enlarged top plan view of parts shown in Figure 10, the base portion being broken away.
Figure 12:
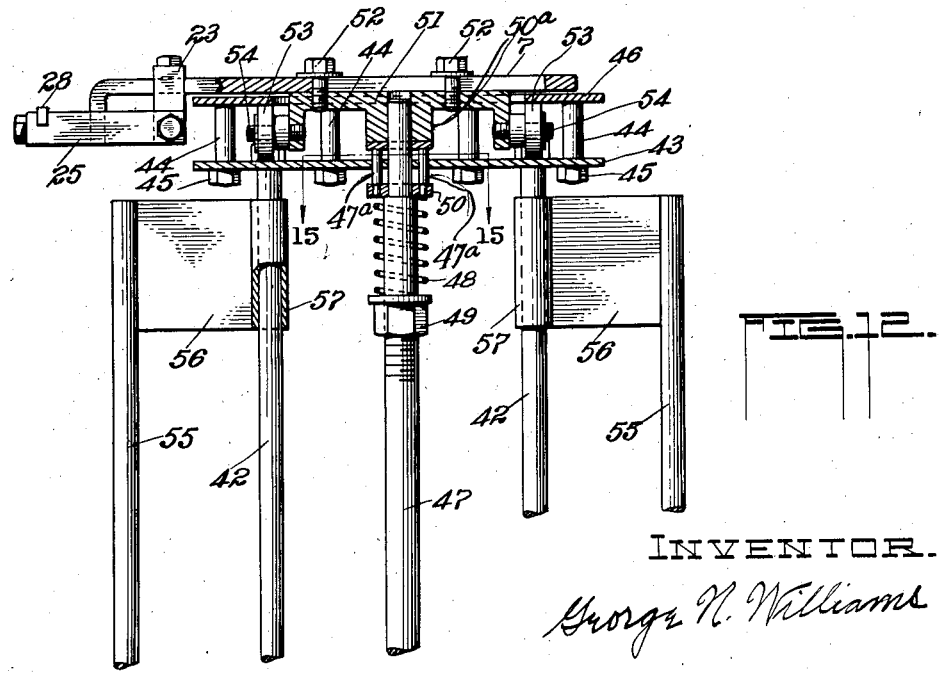
Figure 12 is a partial side elevational view, certain parts being shown in section, as the same would appear if taken on line 12—12 Figure 11.
Figure 13:
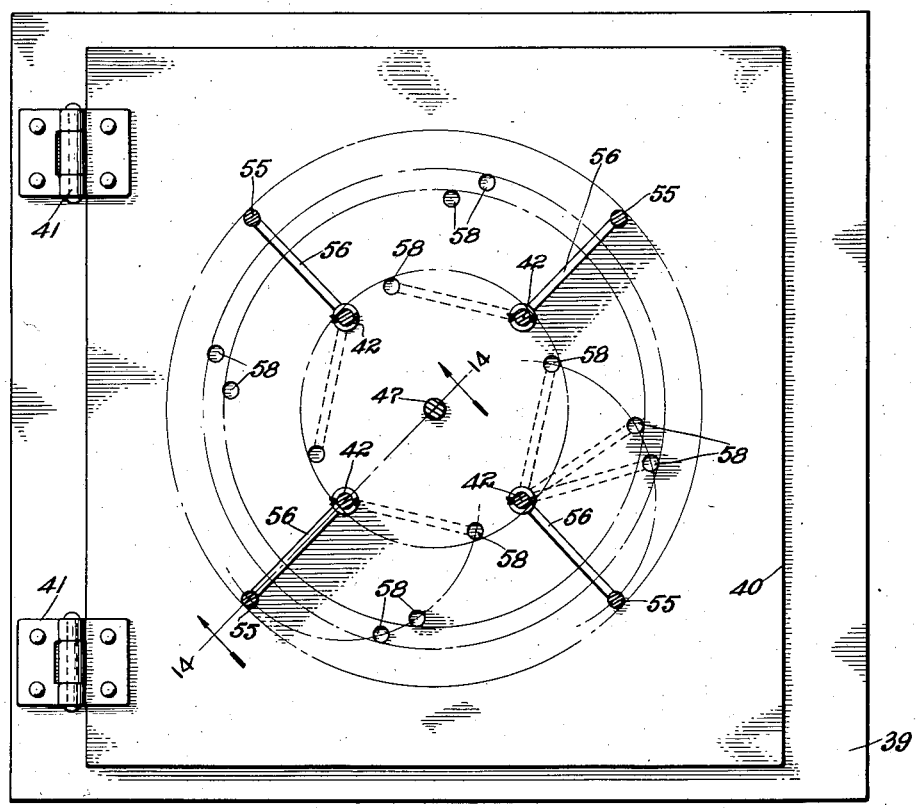
Figure 13 is an enlarged plan view of the base member as the same would appear taken along line 13—13, Figure 10, certain parts being shown by dotted lines.
Figures 14, 15:
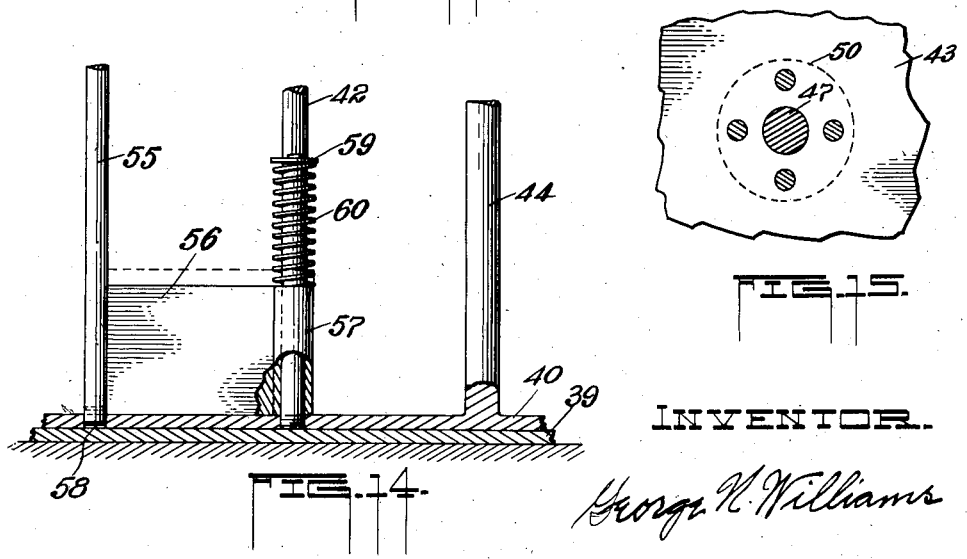
Figure 14 is an enlarged sectional elevational view taken on line 14—14, Figure 13, looking in the direction of the arrows.
Figure 15 is an enlarged fragmentary view taken on line 15—15, Figure 12, looking in the direction of the arrows.

For the purpose of clarity I will describe, first, my non-rotative transfer reel adapted to be used only for approximately one size inside diameter wire bundles. Following I will then describe a modified form of my non-rotative reel adapted for adjustment with respect to the inside diameter of the wire bundles to be placed thereon, and which is also adapted to be tilted for loading.

Where it is desirable to have continuous operation, that is, a continuous supply of wire at all times, I use my reels in pairs and as one reel becomes empty, the feed, or supply of wire, is automatically transferred to the other, or companion reel, of the pair. Then, while the wire is being drawn from the latter reel, an attendant replenishes the wire supply on the empty reel.

Bundles of wire seldom weigh over three hundred pounds each, but they vary considerably in length depending on the gauge, or diameter of the wire. Consequently, I adapt my reels to hold several such bundles of wire. I then weld the front end (top end) of the bottom bundle of wire on the reel, to the back end of the next adjacent bundle on the same reel, and so on for all of the bundles of wire on said reel, thus making a continuous length of wire of a considerable amount. This procedure is not new and I do not claim it as such.

I then weld the front (leading) end of the top bundle of wire on the refilled reel to the last end of the bottom bundle of wire on the reel from which the wire is being drawn so that when the last of the wire leaves the latter reel the wire feed is automatically transferred to the other reel and vice versa as operations proceed.

To carry out this procedure both reels are assumed to be of the stationary, or non-rotative type.

It is necessary that the wire be uncoiled from the reel in some manner, especially if it is green or stiff wire, and this is true even in cases where the wire is soft and flexible but where several bundles are used conjointly as described. This will be readily apparent to those skilled in the art and needs no detailed explanation.

My invention provides the instrumentalities for such uncoiling of said wire and for causing the automatic transfer of the wire feed from one reel to another reel as has been described. These I will now describe.

The reel comprises a base 1, having rigidly inserted therein uprights 2, surmounted by bracing member 3 integral therewith. Rigidly secured to bracing member 3, by means of bolts 4, is circular guide plate 5, projecting beyond uprights 2. Centrally located with respect to said guide plate 5 and uprights 2, is shaft 6, threaded at both ends to receive nuts. Parallel with plate 5, and in spaced relation thereto, is feed bar 7 adapted to revolve about shaft 6 as an axis. Interposed between bar 7 and plate 5 and on shaft 6 is spacer 8 adapted to be used as a sort of rest bearing for feed bar 7 as it revolves. On the upper side of feed bar 7 and on shaft 6, is coiled spring 9 adapted for adjustable tension against bar 7 by means of adjusting nut 10 and lock nut 11. The same adjustment may be made by means of bottom nut 12.

One end of feed bar 7 extends beyond the periphery of plate 5 and is bent downwardly substantially at a right angle, said downward extension 13 together with the main bar body 7 acting as supports for latch parts to be described.

Extension 13 has suitably threaded therein bearing pins 14 and 15, having mounted thereon rollers 16 and 17 respectively, held in spaced relation to extension 13 by spacers 18 and 19 also mounted on pins 14 and 15. Rollers 16 and 17 are adapted to revolve on pins 14 and 15 being positioned by spacers 18 and 19 and held by cotter pins 20 and 21. Rollers 16 and 17 are also adapted to ride on opposite sides of guide plate 5 and so maintain bar 7 in an even plane by acting also as a support therefor.

Secured to bar 7 by means of bolt 22 is supporting saddle member 23 having attached to one of its sides, by bolt 24, a member 25 conforming to a shape best seen in Figure 7. To the other side of saddle member 23, is member 26 secured thereto by bolt 27. Member 26 is shaped similarly to member 25 except as will be explained, and forming therewith rest supports for the latch arm 28. Member 26 differs from member 25 in that the ends of the former are disposed at right angles to bar 7 to form support legs 33 and 34 for bolt 29, the latter supporting latch member 28 (best seen in Figure 7) and latch spring 30. Bolt 29 is threaded on one end to receive holding nut 31 and lock nut 32.

The wire W is carried in the pocket formed by the members 25 and 26 and the latch 28. Said wire is removed from said reel in substantially an upward direction, and the wire being coiled thereabout naturally moves in a circumferential direction and upward around said reel. This movement of the wire W causes the bar 7 to revolve about said reel and pay off said reel and pay off said wire in a manner only otherwise possible when done by hand. The latter is not only very costly but highly impractical.

Keeping in mind also that the last end of the bottom bundle of wire on the reel from which the wire is drawn is welded, or otherwise fastened to the leading end of the top bundle of a companion reel, the transfer action is as follows:

As the last of the final loop of wire is being drawn from one of said reels, the bar 7 stops as there is no looping action to cause said bar to revolve. Consequently, the wire W, is drawn rather taut with respect to said reel and said taut upward movement causes latch 28 to lift and thus allows said wire W to pass to the companion reel. This action is practically instantaneous. Spring 30 then forces latch 28 into its closed position as soon as said wire W passes therefrom. More wire is then placed on the empty reel and the operation again proceeds in the manner described.

Referring again to the drawings, Figure 1 illustrates a pair of my reels, 35 and 36. The wire W is being drawn from reel 35 and has been partially removed therefrom. The bottom end of wire W on reel 35 has been welded to the leading end of the top bundle of wire of companion reel 36 as illustrated by the dot 37, the last end of the bottom wire on reel 36 being free as shown at 38.

Figure 2 illustrates the last of the wire W leaving reel 35 and illustrates also how the upward movement of wire W raises latch 28, said wire W thus being automatically transferred to reel 36.

Figure 3 illustrates the wire feed now transferred to reel 36, reel 35 being empty.

Figure 4 illustrates the wire W now being removed from reel 36, the wire end 38 of reel 36, having been welded to the leading end of the wire W of companion reel 35, the latter in the meantime having had wire placed thereon.

The manner in which my automatic transfer reels function to furnish a continuous supply of wire is now obvious, as are the instrumentalities by which this is accomplished.

It may be necessary to use bundles of wire whose inside diameters vary and the reels just described are not suitable in such an instance. I do not mean that bundles of wire of varying inside diameters are used at the same time. For example, if I am using bundles of wire whose inside coil diameter is "b" then all bundles on the same reel should have approximately the same diameter "b". The bundles on the companion reel may have a different inside coil diameter "c" but all must be approximately of the same diameter on said reel. For this purpose I show a modified reel adapted for adjustment to meet such a condition. Furthermore, the bundles of wire may be heavy and to obviate lifting such bundles I have further modified my reel. These modifications will now be described.

The modified form of my automatic transfer reel comprises bed plate 39 having reel base 40 tiltably mounted thereon by means of hinges 41. Supported upon said base 40 are upright members 42 rigidly mounted thereon and adapted to support circular guide plate 43. Held parallel thereto, and in spaced relation therewith by means of spacers 44 and bolts 45, is upper supporting circular ring plate 46. Centrally located with respect to said plates 43 and 46, and uprights 42 is supporting member 47 rigidly attached to base 40 at its lower end and acting as a shaft at its upper end for the rotation of bar 7. Member 47 is threaded to receive an adjusting nut 49 a short distance below plate 43. Extending thru plate 43 and disposed about shaft 47 are pins 47a to which are secured collars 50 and 50a, collar 50a having member 51 resting thereon and collar 50 being adapted to rest on spring 48 interposed between collar 50 and adjusting nut 49. Adjustment of nut 49 in an upward direction puts a brake tension on member 51, the amount depending on the amount of tension exerted by spring 48. Secured to member 51 by means of bolts 52 is slotted bar 7 adapted to operate as has been previously described except that, in this instance, bar 7 is adjustable for radius length. This is accomplished by loosening bolts 52, moving the slotted bar 7 to the desired position and then tightening bolts 52. The transfer mechanism of my modified reel is similar to that already described. The guide mechanism for bar 7 is modified somewhat in that guide rollers 53 attached to member 51 by means of bolts 54 are adapted to be positioned and guided between plates 43 and 46.

For adjustment, with respect to varying inside coil diameters, are the upright members 55 having secured thereto, at their upper and lower ends, plates 56 and having sleeves 57 formed thereon and adapted to rotate about members 42 which act as shafts therefor. The lower end of each member 55 is positioned in a corresponding recess 58 of base 40; there being several of these recesses 58 each adapted for insertion of the lower end of a member 55. Said recesses may be placed at any point, on a circle, using any shaft 42 as a center and its corresponding plate 56 as the radius. It is thus obvious that the number of positions available for the members 55 depends on the number of recesses provided in plate 40.

Interposed between bottom sleeve 57 and a stop 59 is a tension spring 60 adapted to hold member 55 in recess 58. To move members 55 from one recess to another, the attendant raises member 55 against the pressure of spring 60, moves said member into the desired recess, and spring 60 holds it there.

It is thus obvious that adjustment of my reel to accommodate any inside diameter bundle of wire can be accomplished very quickly and that the adjustment is extremely flexible.

A procedure in using my modified reels is as follows: The reel is adjusted for the wire bundle diameter as has been described and is then tilted on hinges 41. Up-ended bundles of wire are then skidded on to said tilted reel until said reel is loaded. The reel is then raised to its normal vertical position, which due to the leverage employed is relatively easy of accomplishment. The operations then proceed as has already been described.

Or, if it is necessary to unload the reel, it may be tilted as described and the wire removed.

I do not wish to be limited to the forms or modifications shown, these being preferred forms illustrating the principle and uses embodied in my invention. For example, in the following claims I will refer to a reel or a companion reel or both, whereas it is obvious that more than one reel or companion reel may be used. Furthermore said wire may be round or flat or it may be strip or other metal material adapted to be handled in coils.

What I claim is:

1. In a non-rotative reel having wire coiled thereon and thereabout, in combination, paying off means forming a part of said reel adapted to be rotated by the removal of wire from said reel, said rotative movement adapting said means to pay off wire from said reel, a latch means associated with said paying off means adapted to hold wire in association with said means while said wire is payed off and to be unlatched by said wire when said wire passes therefrom when the paying off of said wire is to be transferred from said reel.

2. In a non-rotative reel, in combination, a base member having upright members rigidly mounted thereto and adapted to support coils of wire thereabout, a guide plate mounted on said upright members parallel to said base and in spaced relation therewith, a shaft mounted on said guide members perpendicular thereto and centrally located with respect to said upright members, a member adapted to be rotated about said shaft, a yieldably adjustable braking means for said member mounted on said shaft, a guide means mounted on said member adapted to be guided by said guide plate, a latch means attached to said member adapted to hold wire in association with said member and to be unlatched by said wire when said wire passes from said member.

3. In a non-rotative reel, in combination, a support, a base member tiltably mounted on said support, and having recesses therein, upright members mounted on said base, yieldable members swingably attached to said upright members, a second set of upright members in parallel relation with said first named members and in spaced relation therewith, adapted to be held in certain of said recesses by said yieldable members and further adapted to be lifted from said recesses and swung into positions fixed by other of said recesses for the purpose substantially as described.

4. In a non-rotative reel, in combination, a paying off member forming a part of said reel and adapted to be adjustable with respect to its paying off radius, a latch member attached to said member and adjustable therewith and adapted to hold wire in association with said paying off member and being further adapted to allow the movement of said wire to open said latch when passing from said paying off member.

GEORGE N. WILLIAMS.